United States Patent Office 3,117,949
Patented Jan. 14, 1964

---

3,117,949
DIALDEHYDE POLYSACCHARIDE-POLYACRYL-
AMIDE COMPOSITIONS
Peter J. Borchert, Elkhart, Ind., assignor to Miles Laboratories, Inc., Elkhart, Ind., a corporation of Indiana
No Drawing. Filed July 7, 1960, Ser. No. 41,226
15 Claims. (Cl. 260—73)

This invention relates to polymer compositions derived from polymers of acrylamide and dialdehyde polysaccharides. In one of its more particular aspects this invention relates to films formed from the interaction of polymers of acrylamide and dialdehyde polysaccharides.

The reaction between dialdehyde starch and monomeric acrylamide is covered in my copending application, U.S. Serial No. 27,263, filed May 6, 1960.

Polyacrylamide and its copolymers in the form of aqueous dispersions are used extensively in the preparation of films having a wide variety of industrial applications such as binders for cellulosic fibers, coatings for paper, pigment retention improvers in paper, thickening agents in water base paints and highly effective flocculants among others. Many of the aforementioned uses require films with highly effective water resistance.

It is a well known fact that plastic films formed from aqueous dispersions of polyacrylamide and some of its copolymers have a tendency to swell, soften and re-disperse upon contact with water. Complete destruction of the film takes place within a relatively short period of time depending upon such factors as film thickness, drying conditions and immersion temperature. For many of the uses to which dispersions of these polymers are put a more effective water and scrub resistance and a shorter film drying time is desirable.

Virtual insolubilization of polyacrylamides can be attained in a condensation reaction involving the amide groups of the repeating polymeric units, wherein the polyacrylamide dispersions are treated with large amounts of strong acids, for example, 50 parts by weight of 48% hydrobromic acid to 20 parts dry weight of acrylamide dispersed in water and heated at 90–100° C. for several hours. The result is intra- and intermolecular imidization which tends to reduce water solubility.

A number of substances are capable of undergoing condensation reactions with polyacrylamide and its copolymers to yield water-insensitive films. Some of the operable substances in this instance are urea-formaldehyde resins, melamine-formaldehyde resins, polybasic acids, and the like. In each case high temperatures and relatively large amounts of an acidic catalyst are required to effect the reactions.

Another group of agents which can be used to insolubilize the polyacrylamide dispersions are the dialdehydes, such as glyoxal. A prime disadvantage in using glyoxal, however, especially at temperatures of 65° C. or higher is an undesirable color formation in the films. An added disadvantage is that relatively large amounts of glyoxal are required for insolubilization.

It is accordingly a principal object of this invention to provide polymeric compositions which have the desirable properties of polyacrylamide film-formers and in which the undesirable properties of these polymers are not present.

Another object of this invention is to provide compositions which may be used to form films having improved water resistance.

Another object of this invention is to provide films of superior durability.

A further object of this invention is to provide a method for the preparation of compositions having the aforesaid desirable properties.

Other objects and advantages of this invention will become apparent in the course of the following detailed disclosure and description.

It has now been found that compositions having the already desirable properties of polymers of acrylamide and improved properties with respect to water resistance and durability may be prepared by the interaction of polymers of acrylamide with dialdehyde polysaccharides in the presence of strong acidic catalysts. The resulting compositions are characterized by forming films which are clear and stable not only upon contact with water but even under more severe solvent treatment.

The acrylamide polymers which may be used in the novel compositions of this invention may be homopolymers of acrylamide or copolymers prepared by the copolymerization of acrylamide with various comonomers copolymerizable therewith.

Comonomers which can be used in the practice of this invention include methacrylamide, N - methylolacrylamide, acrylic acid, methacrylic acid, butadienes, acrylonitrile, acrylylurea, butyl methacrylate, ethyl acrylate, methyl acrylate, butyl vinyl ether, diallyl cyanamide, methyl vinyl ketone, styrene, unsaturated alkyds, vinyl acetate, vinyl chloride, vinyl ethers, vinyl ketones, vinyl pyridines, N-vinylpyrrolidone, N-allylacetoacetamide and others of like nature. Copolymers resulting from the copolymerization of acrylamide with mixtures of the above compounds, such as with acrylonitrile and ethyl acrylate, acrylonitrile and methyl acrylate, acrylonitrile and N-methylacrylamide, N - allylacetoacetamide and vinyl acetate, 2-vinylpyridine and methacrylic acid, and other combinations may also be used.

For the sake of convenience, both polyacrylamide itself and acrylamide copolymers will hereinafter be referred to as polyacrylamides.

The polyacrylamides are preferably used as aqueous dispersions which may be made up as required. They are available as powders which may be dispersed in water to form the desired aqueous dispersions.

The dialdehyde polysaccharides which interact with the polyacrylamides to form the novel compositions of this invention are those obtained by the oxidation of polymeric polysaccharides such as by the action of periodic acid. This well known reaction may be exemplified by the oxidation of starches with periodic acid in accordance with the equation shown below:

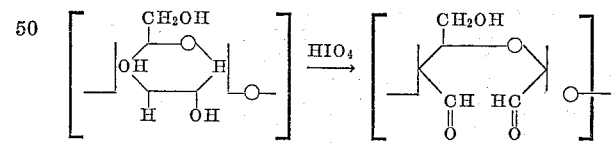

where $n$ represents the number of repeating units in the starch molecule. It may be seen that the resulting product of this oxidation, known in the art as dialdehyde starch, is a polymer which contains two aldehyde groups per glycoside unit of the starch molecule resulting from oxidation of the corresponding 1,2-glycol. Other polysaccharides than starches may be utilized in the preparation of the polymeric dialdehydes, for example, celluloses, dextrins, dextrans, inulins and the like. It will be appreciated that dialdehyde starch and other dialdehyde polysaccharides may exist with varying degrees of oxidation depending upon the conditions under which the oxidation reaction is carried out. For the purpose of this invention, in order to prepare films having the greatest degree of water insensitivity, it is preferred that a highly oxidized dialdehyde starch be used, for example, one comprising a starch which has been about 90% oxidized. By a 90% oxidized starch is meant one in which 90 out of every 100 glycoside units have been converted to the dialdehyde. Other levels of oxidation may, of course, be utilized if desired.

Dialdehyde starch may be advantageously prepared for use in the form of an aqueous dispersion by heating an aqueous slurry of the dialdehyde starch until a homogeneous dispersion of dialdehyde starch is obtained, for example by heating in water at a temperature of about 70° C. Heating with a 0.1 N to 1.0 N solution of a buffer salt such as sodium acetate, sodium bicarbonate, disodium phosphate or the like, at a temperature of 40° C. to 50° C. aids the stability of the dialdehyde starch and is especially effective for this purpose. Dialdehyde starch dispersions may be prepared in any desired concentration. For most purposes, however, a concentration of from about 5% to about 25% is preferred. Dispersions of other dialdehyde polysaccharides may be similarly prepared. Such dispersions may then be utilized for preparing the novel compositions of this invention without further treatment. If the polyacrylamide is to be used as a dispersible powder then the dialdehyde polysaccharide may also be used in this form.

In the practice of the present invention the dialdehyde starch or other dialdehyde polysaccharide may be used in an amount of from about 0.05% to about 2% based on the weight of the polyacrylamide and preferably in the range of from about 0.5% to about 1%. It is notable that in practice about 50–100% less dialdehyde polysaccharide is required than glyoxal for insolubilization of polyacrylamides.

The preparation of these novel polymeric compositions having improved water resistance is physically accomplished by mixing a dispersion of the polyacrylamide with a dispersion of the dialdehyde polysaccharide in the presence of a strong acidic catalyst at a hydrogen ion concentration of from about pH 2 to pH 5. The dialdehyde polysaccharide dispersion may be prepared for use as described above. The polyacrylamide may be similarly prepared by heating the said polymer or copolymer in water, but in general somewhat higher temperatures, for example from about 80° C. to 90° C. are required. If desired, the dialdehyde polysaccharide may be added to the polyacrylamide at a higher temperature than room temperature, but elevated temperatures are not essential for this purpose. In fact, room temperature is preferred since less degradation of the polymers occurs at room temperature than at elevated temperatures.

As catalyst may be used any strong acid. Particularly effective are hydrochloric acid and phosphoric acid. Other acids which may be used include acetic acid, hydrobromic acid, and salts, such as zinc chloride.

The formation of the novel polymeric compositions of this invention and the improved water resistance thereof is believed to be due to a cross-linking reaction between the chains of polyacrylamides on the one hand and dialdehyde polysaccharides on the other. The exact mechanism of the cross-linking reaction is not known but it is likely that interaction between the two types of polymers results in the formation of cross-linkages between the amide groups of the acrylamide fractions and the aldehyde groups of the repeating units of the dialdehyde polysaccharide giving rise to a relatively stable polymeric composition which may be characterized as having the following structure:

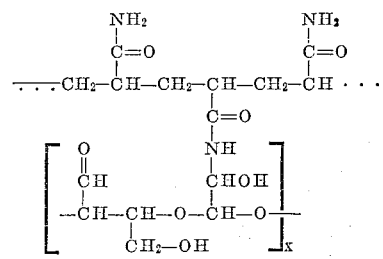

wherein $x$ represents the number of repeating units in the molecule.

This intermolecular cross-linkage formation is found to occur upon drying of the water by evaporation at room temperatures or elevated temperatures. It has been observed that only a slight amount of cross-linkage between the two polymeric chains is required for insolubilization. This effect, of course, gives the films excellent water resistance, as well as other desirable properties.

The invention will be better understood by reference to the following examples which are included for purposes of illustration and are not to be construed as in any way limiting the scope of the instant invention.

EXAMPLE I

A 2.8% dispersion of polyacrylamide was prepared by heating 2.8 g. of polyacrylamide under stirring with 97 g. water at 80–90° C. for 2 hours and then cooled to room temperature.

10 g. of 90% oxidized dialdehyde starch and 90 g. of tap water were heated for 15 minutes under stirring at 70° C., giving a 10% dispersion of dialdehyde starch.

Amounts of 0.5% and 1.0% of the dialdehyde starch dispersion (dry basis) were added to the dispersion of polyacrylamide at room temperature and the pH adjusted to 5 with acetic acid, to 2 with phosphoric acid, to 2 with hydrochloric acid and to 5 with zinc chloride. After mixing the ingredients, films were cast and were either dried for 2 hours at 65° C., following an additional drying at 27° C., or for 16 hours at 27° C. Strips were cut from the films and immersed in water at 25° C. for 2 hours.

The results are summarized in Table I below. Very good results have been obtained with as little as 0.5% dialdehyde starch in the presence of strong acidic catalysts (phosphoric and hydrochloric acid at a pH of 2). Film strips of Experiments 3 and 4 were found to be unchanged and not sticky under the conditions described herein, while strips from Experiments 1, 2 and 5 dissolved within 10 minutes.

*Table I*

| Exp. No. | Dialdehyde starch, percent (dry basis) | Catalyst | pH | Observations upon immersion at 25° C. for 2 hrs. | |
|---|---|---|---|---|---|
| | | | | Oven dried 2 hrs. at 65° C. following 12 hours drying at 27° C. | Dried at 27° C. for 16 hours. |
| 1 | | Acetic acid | 5 | Dissolves within 10 min | Dissolves within 10 min. |
| 2 | 1.0 | ___do___ | 5 | Film intact, but soft and sticky. | Do. |
| 3 | 0.5 | Phosphoric acid | 2 | Film intact, somewhat soft, not sticky. | Film intact not sticky. |
| 4 | 0.5 | Hydrochloric acid | 2 | ___do___ | Do. |
| 5 | 0.5 | Zinc chloride | 5 | ___do___ | Dissolves within 10 min. |

The following example illustrates the preparation of the compositions of this invention using a copolymer of acrylamide.

EXAMPLE II

An 8.0% dispersion of a copolymer of acrylamide and acrylic acid was prepared by heating 80 g. of the copolymer with stirring at 80° C. with 920 g. of water until solution took place.

A 10% dispersion of dialdehyde starch was prepared as described in Example No. I. Amounts of 0.5%, 1.0% and 2.0% of the dialdehyde starch dispersion (dry basis) were combined with the dispersion of the copolymer of acrylamide and acrylic acid at room temperature. Then 10% phosphoric acid (based on dry weight of copolymer) was added to pH 2.5. After mixing, the solutions were cast on glass plates at 65° C. for 4 hours, yielding films of from 5–8 mils thickness. Strips were cut from the films and immersed in water at 27° C. and at 100° C.

The results are shown in Table II, following. The blank dissolved in water at room temperature in 6 minutes (experiment 6), while films containing 1% and 2% dialdehyde starch remained in perfect condition for one hour and longer after immersion at 27° C. (experiments 8 and 9), except that swelling had occurred. At the temperature of boiling water the blank dissolved immediately upon immersion (experiment 6), while films made from the addition of 1% and 2% dialdehyde starch remained intact for 15 minutes and longer (experiments 8 and 9).

*Table II*

| Exp.[1] No. | Copolymer, g. | Dialdehyde[2] starch solution, g. | Dialdehyde starch, percent by wt. | Observations—Films cured for 4 hrs. at 65° C. and immersed in water at— | |
|---|---|---|---|---|---|
| | | | | 27° C. | 100° C. |
| 6 | 50 | | | Dissolves in 6 min. | Went immediately into solution. |
| 7 | 50 | 0.39 | 0.5 | Film perfect for 30 min. | Film dissolved completely in 5 min. |
| 8 | 50 | 0.78 | 1.0 | Film perfect for 1 hr. and longer. | Film intact for 15 min. and longer. |
| 9 | 50 | 1.56 | 2.0 | Film perfect for 1 hr. and longer. | Film intact for 15 min. and longer. |

[1] Catalyst—phosphoric acid, 10% by weight.
[2] 5% by weight in tap water.

It can thus be seen that the use of dialdehyde polysaccharides with polyacryamides results in films which do not re-disperse upon immersion in water even at elevated temperatures. On the other hand, films formed from polyacrylamides alone are seen to re-disperse in water within a very short period of time and usually within a few minutes. The novel compositions of this invention, then, have been shown to have enhanced water resistance and improved stability and films formed from these compositions have been shown to be considerably more durable than films formed from polyacrylamides themselves.

In summary, this invention provides polymeric compositions formed from the interaction of polyacrylamides and dialdehyde polysaccharides in the presence of strong acidic catalysts. These compositions are capable of forming films of greatly improved water resistance and durability.

Other embodiments than those specifically described may, of course, be used in the practice of this invention and are intended to be included within the scope thereof, which is defined in the appended claims.

What is claimed is:

1. A composition comprising a product obtained by reacting a polymer of acrylamide with a dialdehyde polysaccharide in the presence of a strong acid catalyst, said polymer of acrylamide and said dialdehyde polysaccharide being reacted in the form of aqueous dispersions thereof, said dialdehyde polysaccharide being a highly oxidized dialdehyde polysaccharide and being used in an amount of about from 0.05% to about 2% based on the weight of the polymer of acrylamide, said reaction being conducted at a hydrogen ion concentration of about from pH 2 to pH 5.

2. A composition according to claim 1 wherein the catalyst is a member selected from the group consisting of hydrochloric acid and phosphoric acid.

3. A composition according to claim 1 wherein the polymer of acrylamide is a homopolymer of acrylamide.

4. A composition according to claim 1 wherein the polymer of acrylamide is a copolymer acrylamide with a comonomer copolymerizable therewith.

5. A composition according to claim 1 wherein the dialdehyde polysaccharide is dialdehyde starch.

6. A composition according to claim 1 wherein the polymer of acrylamide is a copolymer of acrylamide and acrylic acid.

7. A film formed upon drying of an aqueous dispersion of the product of claim 1.

8. A process for the preparation of a water insensitive polymeric composition which comprises reacting a polymer of acrylamide with a dialdehyde polysaccharide in the presence of a strong acid catalyst, said polymer of acrylamide and said dialdehyde polysaccharide being reacted in the form of aqueous dispersions thereof, said dialdehyde polysaccharide being a highly oxidized dialdehyde polysaccharide and being used in an amount of about from 0.05% to about 2% based on the weight of the polymer of acrylamide, said reaction being conducted at a hydrogen ion concentration of about from pH 2 to pH 5.

9. A process according to claim 8 wherein the catalyst is a member selected from the group consisting of hydrochloric acid and phosphoric acid.

10. A process according to claim 8 wherein the polymer of acrylamide is a homopolymer of acrylamide.

11. A process according to claim 8 wherein the polymer of acrylamide is a copolymer of acrylamide with a comonomer copolymerizable therewith.

12. A process according to claim 8 wherein the dialdehyde polysaccharide is dialdehyde starch.

13. A process according to claim 8 wherein the polymer of acrylamide is a copolymer of acrylamide and acrylic acid.

14. A process according to claim 8 wherein the aqueous dispersion of the dialdehyde polysaccharide is prepared by heating an aqueous slurry of said dialdehyde polysaccharide with a 0.1 N to 1.0 N solution of a buffer salt at a temperature of about from 40° C. to 50° C.

15. A process for the preparation of a water insensitive film which comprises reacting a polymer of acrylamide with a dialdehyde polysaccharide in the presence of a strong acid catalyst, said polymer of acrylamide and said dialdehyde polysaccharide being reacted in the form of aqueous dispersions thereof, said dialdehyde polysaccharide being a highly oxidized dialdehyde polysaccharide and being used in an amount of about from 0.05% to about 2% based on the weight of the polymer of acrylamide, said reaction being conducted at a hydrogen ion concentration of about from pH2 to pH5 and drying the resulting aqueous dispersion to form a film.

References Cited in the file of this patent

UNITED STATES PATENTS

| 2,885,394 | Barry et al. | May 5, 1959 |
| 2,890,978 | Woodberry et al. | June 16, 1959 |

OTHER REFERENCES

Hofreiter et al.: TAPPI 43, 639–43, 1960.

UNITED STATES PATENT OFFICE
CERTIFICATE OF CORRECTION

Patent No. 3,117,949                                January 14, 1964

Peter J. Borchert

It is hereby certified that error appears in the above numbered patent requiring correction and that the said Letters Patent should read as corrected below.

Column 2, lines 49 to 54, the equation should appear as shown below instead of as in the patent:

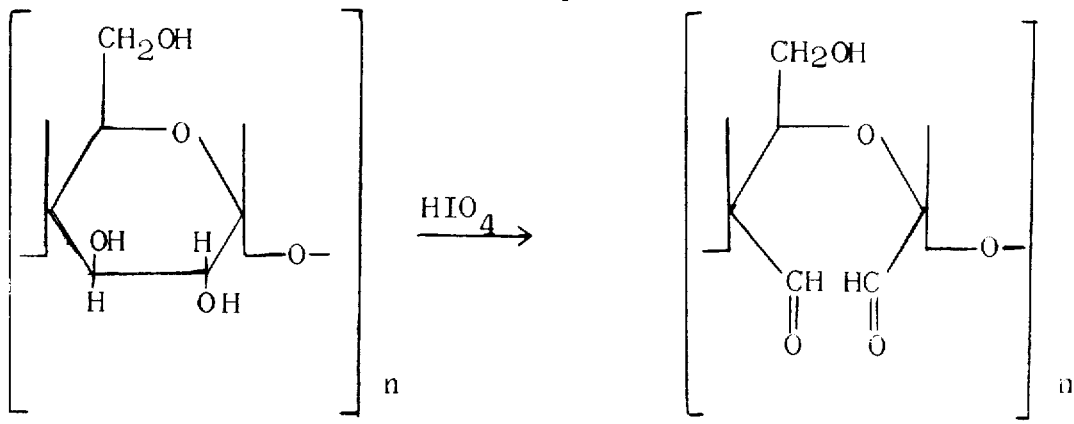

Signed and sealed this 30th day of June 1964.

(SEAL)
Attest:

ERNEST W. SWIDER                               EDWARD J. BRENNER

Attesting Officer                              Commissioner of Patents